United States Patent [19]

Melman et al.

[11] Patent Number: 4,668,045

[45] Date of Patent: May 26, 1987

[54] OPTICAL FIBER CENTERING DEVICE

[75] Inventors: Paul Melman, Newton; W. John Carlsen, Boston, both of Mass.

[73] Assignee: GTE Laboratories Incorporated, Waltham, Mass.

[21] Appl. No.: 882,747

[22] Filed: Jul. 7, 1986

Related U.S. Application Data

[63] Continuation of Ser. No. 454,943, Jan. 3, 1983, which is a continuation-in-part of Ser. No. 223,192, Jan. 7, 1981.

[51] Int. Cl.$^4$ .............................................. G02B 6/36
[52] U.S. Cl. .............................. 350/96.20; 350/96.10; 350/96.21
[58] Field of Search .......................... 350/96.20, 96.21

[56] References Cited

U.S. PATENT DOCUMENTS

| | | | |
|---|---|---|---|
| 3,510,641 | 5/1970 | Reynolds | 240/1 |
| 3,517,981 | 6/1970 | Rueger et al. | 350/96.20 |
| 3,649,098 | 3/1972 | Suverison | 350/96.18 |
| 4,183,618 | 1/1980 | Rush et al. | 350/96.18 |
| 4,257,674 | 3/1981 | Griffin et al. | 350/96.21 |
| 4,273,413 | 6/1981 | Bendiksen et al. | 350/96.20 |
| 4,360,249 | 11/1982 | Slemon | 350/96.18 |
| 4,391,487 | 7/1983 | Melman et al. | 350/96.20 |
| 4,420,219 | 12/1983 | Muchel | 350/96.18 |
| 4,421,383 | 12/1983 | Carlsen | 350/96.21 |

FOREIGN PATENT DOCUMENTS

| | | | |
|---|---|---|---|
| 2722367 | 12/1977 | Fed. Rep. of Germany | 350/96.18 |
| 2334969 | 12/1975 | France | |

OTHER PUBLICATIONS

"Low Loss Optical Coupler", IBM Tech. Discl. Bulletin, vol. 22, No. 12, May 1980, pp. 5288-5290, by Archey et al.

"Optical Spectra", Oct. 1980, pp. 41-42, Article entitled Connectors That Stretch, by Melman et al.

Primary Examiner—William L. Sikes
Assistant Examiner—Akm E. Ullah
Attorney, Agent, or Firm—Fred Fisher

[57] ABSTRACT

A centering device holds an optical fiber along an axis with three fiber receiving sections and a receiving member. The receiving member has a concentric cylindrical cavity for holding assembled sections. Each section, substantially identical, has a uniform cross-sectional configuration at right angles along a major portion of its length forming a boundary of fixed perimeter. One portion of one section contacts another section. Another portion contacts a different section. A third portion contiguous to the first two portions is adapted to engage an optical fiber along its length. A fourth portion contiguous to the first two, but not to the third, engages the cylindrical wall defined by the concentric cavity. The cavity terminates with a planar wall perpendicular to the axis. It can have an axially oriented truncated conical recess. The fourth portion of the boundary engages differing amounts of a cylindrical wall depending upon the shape of the fourth portion. The sections include elastomeric material for a passageway defined by the third portions to expandably receive an optical fiber dimensioned larger than the passageway. The passageway can have a triangular cross-section for receiving a fiber having a circular cross-section. It can flare outwardly from a position interior receiving means to respective ends thereof. Passageway flaring can have various shaped configuration. The assembled three fiber receiving sections can have a polygonal shaped external surface. The receiving member can be transparent.

18 Claims, 10 Drawing Figures

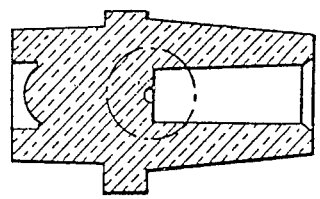
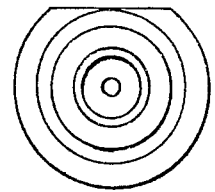
FIG. 7       FIG. 8
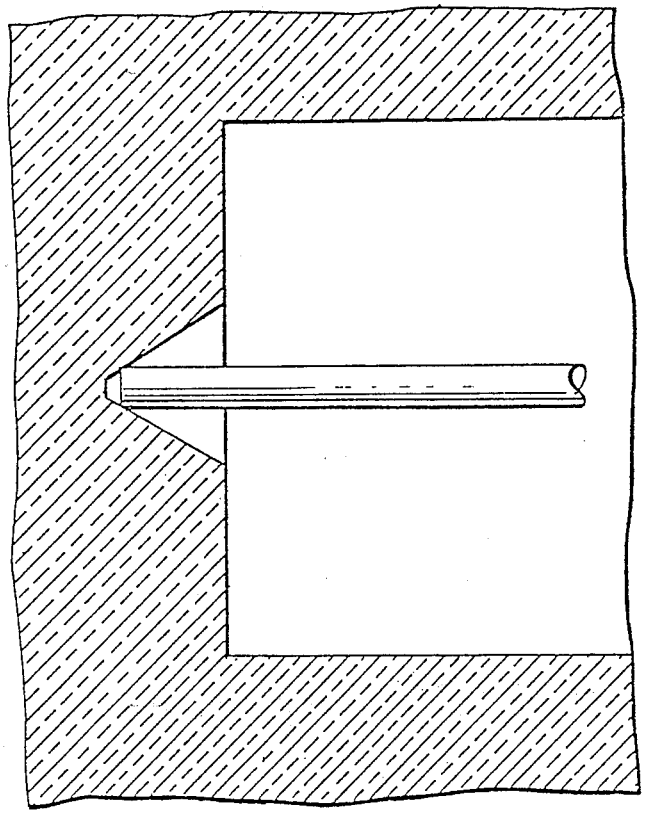
FIG. 9

OPTICAL FIBER CENTERING DEVICE

CROSS-REFERENCE TO RELATED APPLICATION

This is a continuation of co-pending application Ser. No. 454,943, filed Jan. 3, 1983, which, in turn is a continuation-in-part of co-pending U.S. patent application, Ser. No. 223,192, filed Jan. 7, 1981, entitled "OPTICAL FIBER CENTERING DEVICE", by Paul Melman and W. John Carlsen.

BACKGROUND OF THE INVENTION

1. Field of the Invention

This invention relates to optical fiber centering devices and, in particular, to such devices which provide alignment of an optical fiber with high accuracy so as to be suitable for use in numerous fiber coupling designs. Accordingly, it is a general object of this invention to provide new and improved devices of such character.

2. Description of the Prior Art

Various techniques were used in the past to center optical fibers. Such techniques, as known, utilized either (1) micromanipulators to initially align an optical fiber either manually or servomechanically before applying epoxy to fix the fiber in place; (2) precision machined holes, or ferrules, in conjunction with epoxying, soldering or crimping; or, (3) watch jewels, often requiring several in tandem, followed by epoxying or crimping.

In the foregoing methods, highly accurate, usually expensive parts were required. Micromanipulators, moreover, could be used only in a laboratory environment or its equivalent. Human or servomechanical adjustment was required and the optical fiber had to be held precisely in place during the epoxy curing time. Machined metal parts used in some connectors required extreme machining accuracy and, hence, were expensive to use. Machined holes and jewels had to be sufficiently large to accept all fiber diameters within a manufacturer's tolerance range, and, therefore, tended to be loose fits for most fibers.

The following three patents were cited during the course of prosecution of applicants' parent application: U.S. Pat. No. 4,181,401 to Jensen, issued Jan. 1, 1980, U.S. Pat. No. 4,201,443 to Hodge, issued May 6, 1980 and U.S. Pat. No. 4,257,674 to Griffin et al., issued Mar. 24, 1981.

U.S. Pat. No. 4,181,401 to Jensen relates to fiber optic waveguide connectors employing a plurality of radially adjustable jaw members. Though Jensen illustrates three jaw members and an aluminum housing having an axially directed bore therein, the Jensen device including solely the jaw members and housing is incapable of centering an optical fiber. Jensen recognizes such incapability by providing a plurality of adjustment screws and associated tapped bores for necessary alignment. Without such adjustment screws by Jensen, centering of optical fibers would be reliably uncertain. Furthermore, there is no suggestion therein to substitute a force fit for the jaws in lieu of the loose adjustable fit with screws disclosed in Jensen. It is further noted that Jensen, illustrating metallic members, does not suggest elastomeric material.

U.S. Pat. No. 4,201,443 to Hodge, which illustrates an optical fiber coupler comprising a guide assembly having three glass rods disposed in a side-by-side array parallel to one another, was cited as of interest in the parent application to show three cylindrical jaws for clamping an optical fiber.

U.S. Pat. No. 4,257,674 to Griffin et al. relates to an elastomeric fiber optic splice and, but for its citation, does not appear to be pertinent.

3. Discussion of Other Art

In two copending U.S. patent applications, one by W. John Carlsen entitled "METHODS OF AND APPARATUS FOR CONNECTING OPTICAL FIBERS", Ser. No. 23,862, filed Mar. 26, 1979, now U.S. Pat. No. 4,325,607, issued Apr. 20, 1982, and the other by W. Griffin, W. John Carlsen and J. E. Benasutti entitled "ELASTOMERIC FIBER OPTIC SPLICE", Ser. No. 32,583, filed Apr. 23, 1979, now U.S. Pat. No. 4,257,674, issued Mar. 24, 1981, there are described fiber optic splices which were designed to precisely align automatically two fibers along the same axis so as to optimize power transfer between them. The instant invention, however, is intended to precisely align a single fiber automatically along an externally defined axis.

In a third copending U.S. patent application by W. John Carlsen entitled "OPTICAL FIBER CONNECTORS", Ser. No. 112,991, filed Jan. 17, 1980, there is described telecentric fiber optic connectors using plastic molded optics. Alignment is achieved by utilizing a variation of the splice configuration shown in U.S. Pat. No. 4,325,607, wherein accuracy of the mold and molding process provide a precise centering.

SUMMARY OF THE INVENTION

Another object of this invention is to provide for new and improved devices to enable an optical fiber to be aligned with high accuracy.

Still another object of this invention is to provide a new and improved optical fiber centering device which can significantly improve the performance of a molded fiber optical connector.

Still yet another object of the invention is to provide for a new and improved optical fiber centering device for use in connection with fiber optic connectors and in packages for detectors, diode lasers and the like.

Yet another object of this invention is to provide for a new and improved optical fiber centering device which can precisely center an optical fiber along an axis of a cylindrical hole into which it has been inserted.

In accordance with a preferred embodiment of the invention, an optical fiber centering device includes fiber receiving means having three sections and a receiving member. The receiving member has an axial centrosymmetric surface of revolution with respect to a fixed axis. The member has a cylindrical, concentric cavity therewithin for holding the sections in assembled relationship. The device is adapted to hold an optical fiber along its axis. Each of the three sections is substantially identical to each other. Each of the three sections has a uniform cross-sectional configuration at right angles along a major portion of its length, forming a boundary of fixed perimeter. The boundary of one of the sections includes a first portion adapted to mate with a matable portion of the boundary of a second section. The boundary of one of the sections includes a second portion adapted to mate with a matable portion of the boundary of the third section. The boundary of one of the sections includes a third portion contiguous to the first portion and the second portion for engaging an optical fiber along the length. The boundary of one of the sections includes a fourth portion contiguous to the first and second portions, but not to the third portion, for engaging the cylindrical wall defined by the concentric cavity. The cavity terminates with a planar wall perpendicular to the axis. The fourth portion can engage the cylindrical wall along a fraction of the fourth portion. In accordance with certain features of the invention, the planar wall has a recess therewithin axially oriented with respect to the axis. The sections comprise an elastomeric material of sufficient resilience to permit a passageway defined by the third portions of the assembled sections to expandably receive an optical fiber dimensioned larger than the passageway. The passageway can have a substantially triangular cross-section for receiving a fiber having a substantially circular cross-section. The passageway can flare outwardly from a position interior the fiber receiving means to respective ends thereof.

In accordance with certain features of the invention, the flaring of the passageway can have a triangular configuration, a hexagonal configuration, or a circular configuration. The fiber receiving means can have an external surface of polygonal shape. The receiving member can comprise a transparent material. The fiber receiving means can be held within the cavity of the member by a force fit. The radius of the three sections, when assembled, but prior to insertion in the cavity, is preferably greater than the radius of the cavity.

In accordance with another embodiment of the invention, an optical fiber centering device for centering the principal axis of an optical fiber along a predetermined axis of the device and for positioning an end of the fiber to a specific location along the predetermined axis includes a receiving member and elastomeric insert means. The receiving member has a cylindrical cavity therewithin whose axis of revolution is coincident with the predetermined axis. The cylindrical cavity terminates at an interior end surface that intersects the predetermined axis at the specific location where the end of the fiber is to be positioned. The elastomeric insert means is insertable into the cylindrical cavity. The elastomeric insert means has an external configuration in the shape of a first right regular prism whose cross-section perpendicular to its principal axis of symmetry is a first regular polygon with with vertices that extend from the axis of symmetry a distance slightly greater than the radius of the cylindrical cavity, such that when the elastomeric insert means is inserted into the cavity, the vertices are elastically compressed so that resulting elastic restoring forces act to center the axis of symmetry with respect to the axis of revolution and, in turn, the predetermined axis. The elastomeric insert means further contains an internal passageway in the shape of a second right regular prism whose principal axis of symmetry is coincident with the axis of symmetry of the external configuration. A cross-section of the internal passageway, perpendicular to its axis of symmetry, is a second regular polygon whose closest distance from a point on the perimeter thereof to the center of the second regular polygon is smaller than the radius of the smallest diameter of fiber to be centered and to be positioned along the predetermined axis. Thus, an optical fiber inserted into the internal passageway compresses the elastomeric insert means such that resulting elastic restoring forces automatically center the fiber along the axis of symmetry of the first right regular prism, such axis of symmetry coinciding with the predetermined axis of the device. In accordance with certain features of the invention, the receiving member comprises transparent material. The internal passageway of the elastomeric insert means can flare outwardly from a position therewithin to an end thereof where a fiber is to be inserted so as to facilitate manual insertion of the fiber. The first regular polygon can have an infinite number of sides so that it has a circular shape. The external configuration can have a radius slightly larger than that of the cylindrical cavity. The second regular polygon can have an infinite number of sides so that it has a circular shape. The internal passageway can have a radius slightly smaller than that of the smallest diameter of fiber to be centered and to be positioned along the predetermined axis. The first regular polygon can be a regular hexagon. The second regular polygon can be an equilateral triangle. The elastomeric insert means can comprise three identical parts, each part having first and second matable surfaces which, when assembled, mate respectively with corresponding matable surfaces of the other two parts. They mate along plane surfaces whose planes intersect at a common axis of symmetry of the first and the second regular polygons. This assures an optimum three-fold symmetry of the insert means with respect to the common axis. Each of the three identical parts can be produced by a common mold. With certain features, the first regular polygon can be a regular hexagon, the second regular polygon can be an equilateral triangle, and the three planes formed by the assembled mating insert parts pass through respectively the three vertex lines of the inner triangle and through respectively three of the six vertex lines of the outer hexagon. Thus, the three identical insert parts slip into mutual alignment when inserted into the cylindrical cavity.

In accordance with a more preferred embodiment of the invention, an optical fiber centering device for centering the principal axis of an optical fiber along a predetermined axis of the device and for positioning an end of the fiber to a specific location along the predetermined axis includes a receiving member and elastomeric insert means. The receiving member has a cylindrical cavity therewithin having an axis of revolution coincident with the predetermined axis. The cylindrical cavity terminates at an interior end surface. The interior end surface contains a recess for further centering an end of the optical fiber along the predetermined axis to a degree greater than that achievable in the absence of the recess, such that the following occurs:

1. all cross sections through the recess and perpendicular to the predetermined axis are shapes in which a unique circle can be inscribed with its center on the said axis, 2. the size of the cross-section of the recess at the interior end surface of the cylindrical cavity is greater than that of the largest diameter fiber to be centered and positioned, 3. the size of the cross-sections decreases smoothly and monotonically away from the cylindrical cavity end surface until the recess terminates at a cross-section smaller than that of the smallest diameter fiber to be centered and positioned such that an inserted fiber is guided smoothly along a wall of the recess and is stopped when the cross-sectional dimensions of the recess no longer is greater than the diameter of the inserted fiber, and 4. the depth of the cylindrical cavity and the recess are such that the specific location along the predetermined axis where the one end of the fiber is to be positioned is where the cross-sectional dimensions of the recess permits the nominal dimensions of the fiber to be centered and positioned. The elastomeric insert means is insertable to the cylindrical body, the insert means having an internal passageway. Thus, an optical fiber inserted into the elastomerical insert means causes resulting elastic restoring forces to automatically center the fiber along the predetermined axis.

In accordance with certain features of the invention, the recess can be a truncated conical recess. The depth of the recess can be 0.015 inch, the recess can terminate at a cross-section of 0.003 inch, the wall of the recess can form an angle of 30° with respect to the predetermined axis, the receiving member can be an integral part of a telecentric optical connector, the telecentric optical connector can include an integrally molded lens surface whose optical axis coincides with the predetermined axis and whose focal point coincides with the specific location.

BRIEF DESCRIPTION OF THE DRAWINGS

Other objects, advantages and features of this invention, together with its construction and mode of operation, will become more apparent from the following description, when read in conjunction with accompanying drawing, in which:

FIG. 7 is a sectional view of still another embodiment of the invention, as applied to a telecentric optical connector (with elastomeric insert means being deleted for simplicity of illustration), taken along the line 7—7 of FIG. 8;

FIG. 8 is an end view of the embodiment shown in FIG. 7; and

FIG. 9 is an enlarged detail of a portion of FIG. 7.

DESCRIPTION OF PREFERRED EMBODIMENTS

Figure 1:
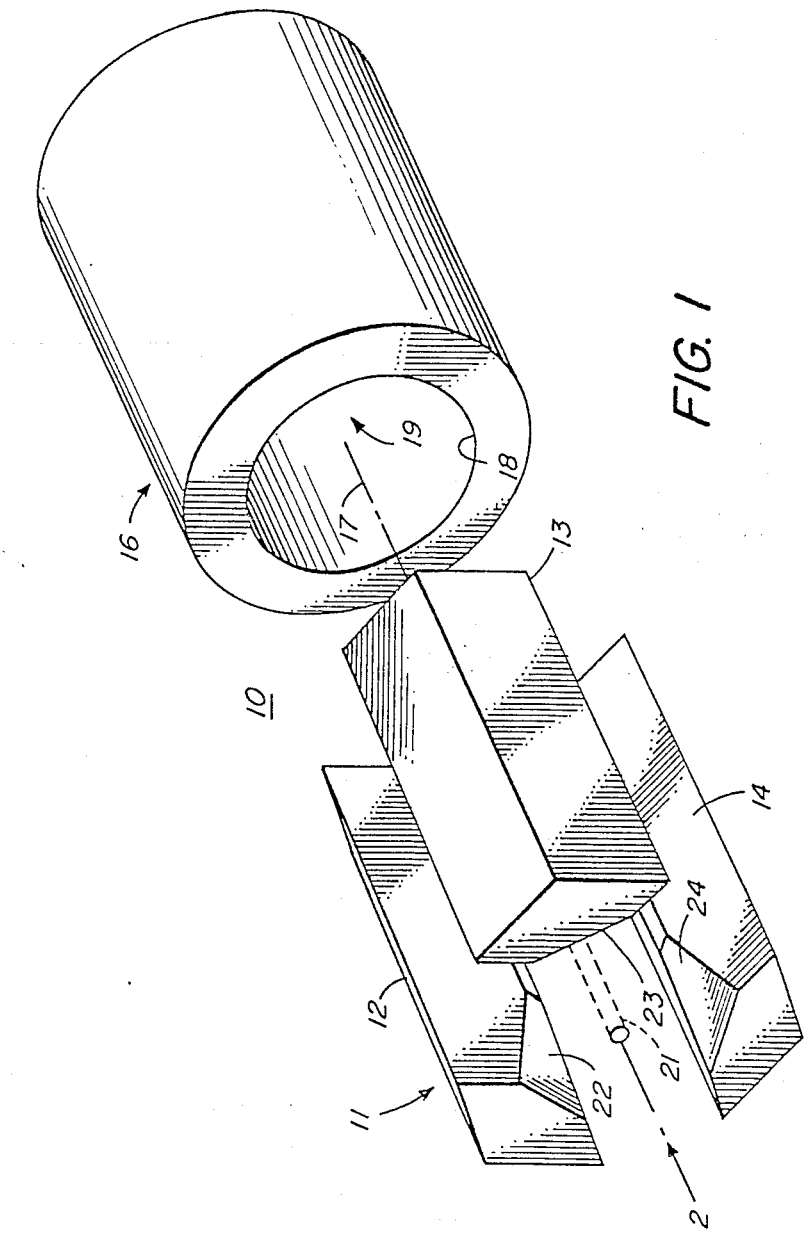
FIG. 1 is an exploded perspective view of one embodiment of this invention illustrating an optical fiber centering device, with an optical fiber illustrated in dotted line format.
Figure 2:
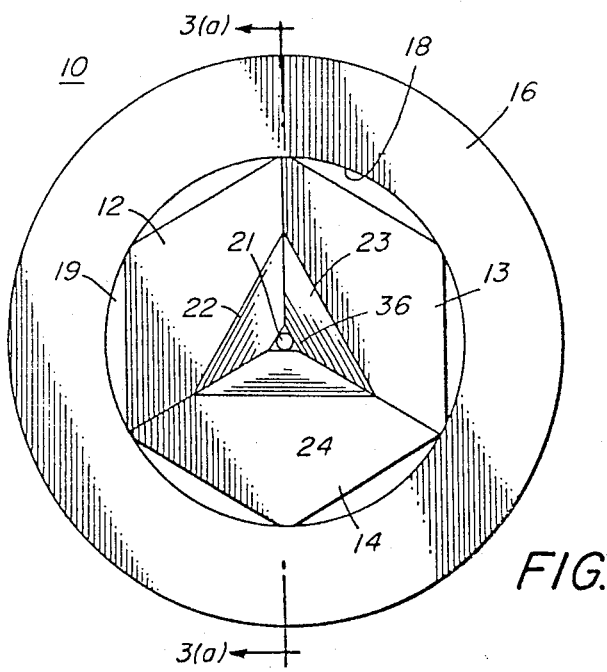
FIG. 2 is a front view of an assembled device shown in FIG. 1, viewed along the line -2- thereof.
Figure 3A:
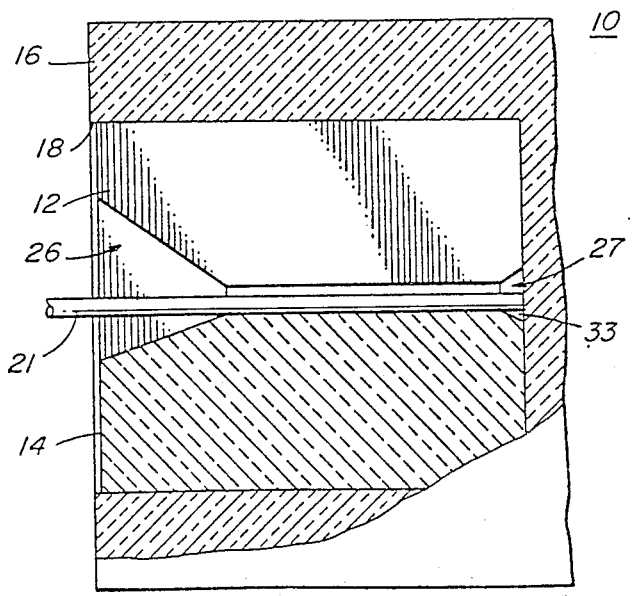
FIG. 3(a) is a sectional view of one embodiment of the invention taken along the line 3(a)—3(a) of FIG. 2.

Referring to the drawing, in connection with one embodiment of the invention, FIG. 1 depicts an exploded view, FIG. 2 is a view taken along the direction -2- of FIG. 1, and FIG. 3(a) depicts a sectional view taken along the line 3(a)—3(a) of FIG. 2. The embodiment, as depicted in these views, includes an optical fiber centering device 10. The centering device 10 includes fiber receiving means 11 having three identical sections, 12, 13, and 14.

The optical fiber centering device 10 further includes a receiving member 16. The receiving member has a fixed axis 17 and has an internal surface defined as a surface of revolution 18 with respect to the fixed axis 17.

The receiving member 16 further contains a cylindrical cavity 19 therewithin for holding the three sections 12, 13, and 14 in assembled relationship. By so doing, the optical fiber centering device 10 is enabled to hold an optical fiber 21 along the axis 17.

It is believed that three sections 12, 13, and 14 are optimal, but four, two, or perhaps even one section would suffice if one could mold such other number of sections to sufficient accuracy.

The three sections 12, 13, and 14 are substantially identical since, preferably, they each have been molded by the same mold to ensure their mutual identity. As the three identical sections 12, 13, and 14 form, when mated, a symmetrical solid insert with a common central axis for both the outer and inner cross-sections, it precisely centers the optical fiber 21 along the axis 17 of the cylindrical cavity 19 into which it has been inserted. The axially symmetric elastic restoring forces of the inner surfaces against the larger fiber, and of the outer surfaces against the smaller receiving cavity, provide automatic holding and centering of the fiber in the insert and of the insert within the cavity.

The sections 12, 13, and 14 are provided with tapers 22, 23, and 24 to form a triangular shaped flared entrance taper 26, as best viewed in FIG. 3(a), to facilitate manual insertion of the fiber 21. An exiting taper 27 can be provided, if desired. The major portion of the fiber receiving means 11, however, does not contain either the taper 26 or the taper 27.

Figure 5:
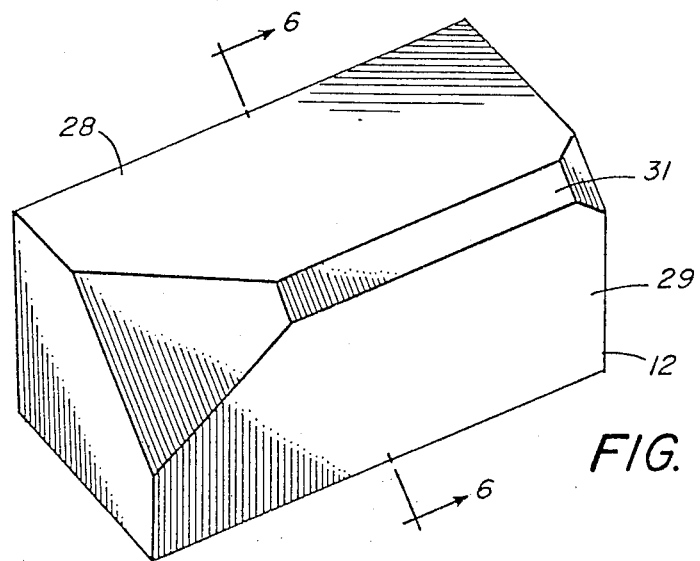
FIG. 5 is a perspective view of a section of a fiber receiving means shown in combination in FIGS. 1–4.
Figure 6:
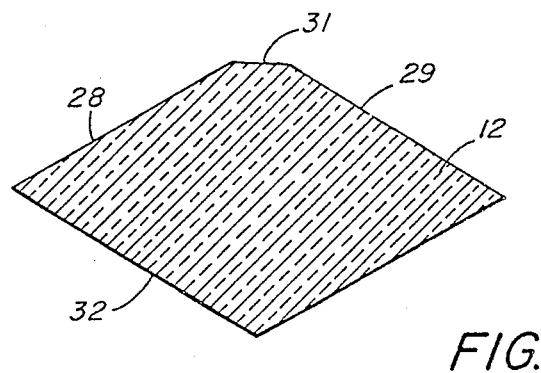
FIG. 6 is a view taken along the line 6—6 of FIG. 5.

FIG. 5 depicts a perspective view of one section 12, and FIG. 6 shows a sectional view of the section shown in FIG. 5 taken along the line 6—6 thereof. Each of the sections 12, 13, and 14 has a uniform cross-sectional configuration at right angles along a major portion of its length, forming a boundary of fixed perimeter as best shown in FIG. 6. The section 12, as shown in FIG. 6, includes a first portion 28 which is adapted to mate with a matable portion of the boundary of a second section, such as section 13, for example. The boundary of the section 12 includes a second portion 29 which is adapted to mate with a matable portion of the boundary of a third section, for example, section 14. The boundary of the section 12 includes a third portion 31 contiguous to the first portion 28 and the second portion 29 for engaging an optical fiber 21 along the length of the section 12. The boundary of the section 12 further includes a fourth portion 32 contiguous to the first portion 28 and the second portion 29, but not to the third portion 31, for engaging the cylindrical wall defined by the concentric cavity 19.

The cavity 19 terminates with a planar wall 33 perpendicular to the axis 17.

Figure 3B:
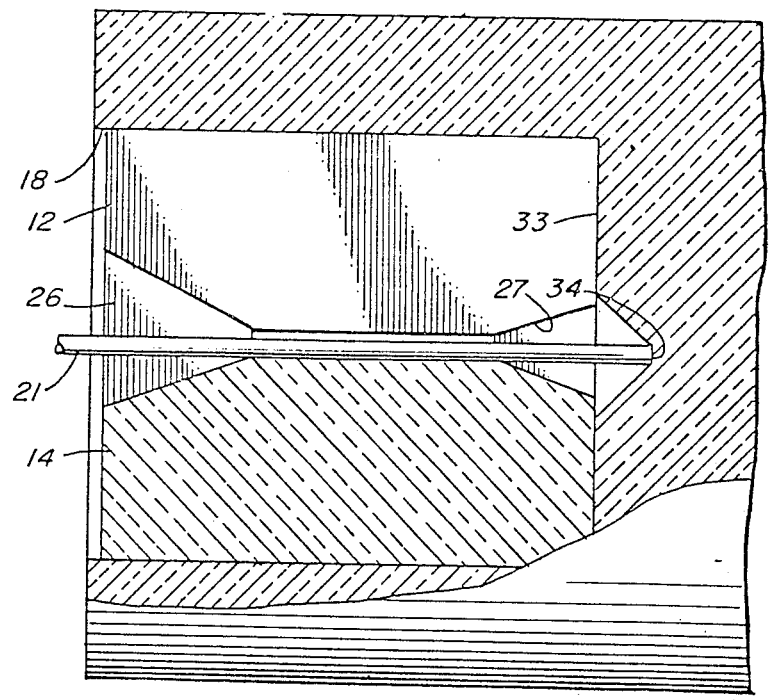
FIG. 3(b) is a sectional view of another embodiment of the invention taken along the line 3(a)—3(a) of FIG. 2.

Another embodiment is depicted in FIG. 3(b) which should be viewed jointly with FIG. 1 and FIG. 2. FIG. 3(b) is similar to FIG. 3(a) with the planar wall 33 further containing a recess 34 therewithin axially oriented with respect to the axis 17.

The fourth portion 32 of the section 12, and corresponding portions of the sections 13 and 14, each engage the cylindrical wall of the receiving member 16 along all or part of its surface. The size of the sections 12, 13, and 14 is such that they are larger than the cavity 19, when assembled but prior to insertion thereinto. In similar respect, the sections 12, 13, and 14 comprise elastomeric material of sufficient resilience to permit a passageway 36 defined by the third portions 31 of the assembled sections 12, 13, and 14 to expandably receive an optical fiber 21 dimensioned larger than the passageway 36.

The passageway 36 can have a substantially triangular cross-section, as shown in FIG. 2, for receiving an optical fiber 21 having a substantially circular cross-section.

As depicted in FIG. 3(a), the passageway 36 flares outwardly from a position interior the fiber receiving means 11 to respective ends thereof. The flaring of the passageway, as viewed in FIG. 1 and FIG. 2, can be of triangular configuration. Alternatively, other flare configurations, such as circular configurations and hexagonal configurations are acceptable. The fiber receiving means 11, when assembled, but prior to insertion within the receiving member 16, has an external surface of cylindrical or polygonal shape, preferably hexagonal. The receiving member 16 can be of a transparent material and can hold the fiber receiving means 11 by way of a forced fit. The radius of a circle circumscribed around the three sections 12, 13, and 14, when assembled but prior to insertion in the cavity 19, is greater than the radius of the cavity 19.

The axis 17, along which an optical fiber 21 is to be aligned in a connector or other component, is defined as the axis 17 of the cylindrical shaped hole 19 of the outer rigid housing 16 into which the centering device 11 is inserted, as indicated in FIG. 1. Furthermore, the desired position of the end of the fiber 21, along the axis 17, is normally defined by a surface along a planar wall 33 at the end of the cylindrical hole 19. The fiber 21 is simply pushed through the centering device 11 until it is stopped by, and abuts, the end surface of the planar wall 33. The end surface can be, as for example:

1. a focal plane surface of the molded telecentric connector or related connector design set forth in the copending application by Carlsen, "Optical Fiber Connectors", Ser. No. 112,991, filed Jan. 17, 1980,
2. a surface of a light detector, such as a photodiode,
3. an output surface or window of a light source, such as a light-emitting diode, or
4. an output window of a hermetically sealed package containing an atmosphere sensitive light source, such as a diode laser, whose protected emitting surface is imaged by a lens onto an outside surface of the window at a point where the fiber abuts.

The optical fiber centering device 10, preferably, is made of a moderately soft elastomer. When the three sections 12, 13, and 14 of the fiber receiving means 11 are assembled, as shown in FIG. 2, the outer surface is in a shape of a hexagonal prism whose geometrical size is slightly too large to fit into the cylindrical hole 19 of the receiving member 16 without distortion. Because of its elasticity, however, the six points of the hexagon can compress sufficiently to allow the device 11 to be inserted into the hole 19 with a small amount of force and to remain there without the addition of adhesives. Due to the symmetric shapes of the hole 19 and of the insert 11 about their respective axes, and also because of the identical shapes of the three sections 12, 13, and 14 of the fiber receiving means 11 relative to its axis, the elastic restoring forces of the compressed insert material tend to position the insert 11 symmetrically about the axis 17 of the cylindrical receiving member 16. Similarly, the triangular hole 36 at the center of the insert 11 automatically centers about the axis 17 of the cylindrical hole 19. Thus, the fiber is automatically held and centered along the axis of the cylindrical cavity 19.

Due to the symmetry of the fiber receiving means 11 and its elasticity, the size thereof is not critical relative to the diameter of the cylindrical hole 19. Such characteristic is important, as in most precision molding operations many parameters are involved which cannot be completely controlled and replicated from run to run, thereby resulting in up to several percent variations of material shrinkage. The one critical dimension, the size of the central triangular hole into which a fiber 21 is to be inserted (actually, the length of one side of that triangle as defined by one of the surfaces on the three identical molded parts 12, 13, and 14) is relatively insensitive to run-to-run shrinkage variations. Although its absolute dimensions are very small (approximately 190 micrometers for a 125 micrometer diameter fiber), once it is achieved from the mold, a few percent variation is not significant to its proper operation.

The triangular cross-sectional central hole 36, once formed and automatically centered in the cylindrical hole 19, functions very much like the triangular hole in the copending United States patent application by Griffin, Carlsen and Benasutti entitled "ELASTOMERIC FIBER OPTIC SPLICE", SER. No. 32,583, filed Apr. 23, 1979, now U.S. Pat. No. 4,257,674, issued Mar. 24, 1981. The size of the triangle is such that a circle geometrically inscribed within it is slightly smaller than the circular cross-section of the fiber 21 to be inserted into it. It has been found that an inscribed circle with a diameter of approximately 110 micrometers is suitable for a 125 micrometer diameter fiber when using several elastomer materials with a "Shore A" hardness of approximately 90, the exact optimal size being determined experimentally for a given material.

The elastic walls of the triangular hole 36, therefore, are deformed by the insertion of the fiber 21. The elastic restoring forces of the compressed material, because of the symmetry, tend to position the fiber 21 to where the three forces are equal, that is, such that the axes of the fiber 21 and of the original triangular hole 36 are along the same line. In particular, the fiber 21 is automatically centered along the axis 17 of the cylindrical hole 19 into which the centering device 11 has been inserted. As shown in the drawing, the entrance of the assembled centering device 11 is tapered out to many times the central triangular hole size, thus making it easy to "thread" the fiber 21 onto the device 11 by hand without the use of magnifying optics. The cross-section of the taper can most easily be made triangular like the shape of the hole it is tapering into, as shown in the drawing, but may have any other shape that merges smoothly with the hole shape.

It is to be noted that this invention differs from that covered by U.S. Pat. No. 4,257,674 in that this invention teaches the alignment of a fiber to the axis of an exterior receptable rather than to another fiber within the same hole. Thus, special attention is devoted to making the elastic restoring forces radially symmetric with respect to an axis which is common to both the external and internal surfaces.

Primarily, as set forth above, it has been assumed that the end surface of the cylindrical hole 19 is simply a plane surface 33 into which the fiber 21 abuts, leaving the centering of the fiber 21 to the centering unit 11. This indeed is the case in most applications of the centering device 11. There are, however, some cases where the fiber 21 must be precisely positioned to a particular point which might not be as precisely located on the axis 17 of the cylindrical hole 19. There are also cases where it is important to achieve a precise alignment, even when the desired location is on the axis 17, that an automatic backup final alignment mechanism is desired to insure against small, undetected defects in the molded parts of the centering insert 11. Examples of such cases are:

1. the plastic molded telecentric connector, as set forth in the U.S. patent application, Ser. No. 112,991, for which it is extremely difficult for a moldmaker to center the relatively large cylindrical hole along the lens optical axis to within several tenths of a micron, but much easier to locate a smaller detailed structure to that accuracy, or 2. a semiconductor device, such as a Burrus-type light-emitting diode, that cannot be fabricated integral to the cylindrical alignment hole, and which cannot be accurately positioned in the same place on the chip from batch to batch.

Figure 4:
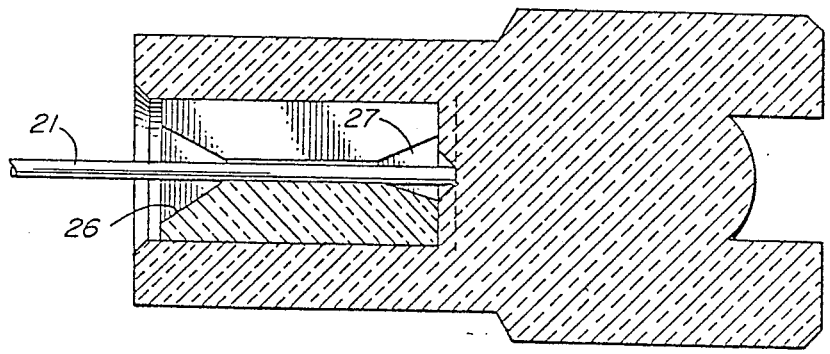
FIG. 4 is a view, similar to that of FIG. 3(b), as applied to a telecentric optical connector.

FIG. 3(b) illustrates generally how that can be achieved, and FIG. 4 illustrates how this can be performed using a molded telecentric connector as an example. There are two differences from the previous case depicted in FIG. 3(a). FIGS. 3(b) and 4 show an enlarged taper at the internal end of the insert 11. Such taper permits the fiber 21, after having been accurately aligned at or close to the axis 17 of the cylindrical hole 19, to be moved laterally a small amount at the end without significantly changing its angular orientation. As indicated, the two tapers need not have the same size and shape. The embodiment 11 depicted in FIG. 3(a) may or may not have the internal taper. It is not necessary. However, for uniformity of parts and for cost, it may be desirable to have the same type insert 11, whether it is to be used in a receiving member 16 that has a planar surface, or whether it is to be used in a receiving member that has a depression therewithin.

The second difference is the depression or indentation shown on the internal end surface of the cylindrical hole 19. Such an indentation or depression can be performed by a variety of methods, depending upon the application. In the case of a molded connector, as depicted in FIG. 4, the indentation would simply be molded in the end of the hole in the connector, having been accurately positioned on the optical axis 17 of the molded lens. However, in the case of the light-emitting diode, the indentation, or recess, can be an etched structure on the chip itself. In any event, when the fiber 21 is inserted through the centering device 11, and pushed to the end surface, if the fiber approaches slightly off from the center of the indentation, the conical side walls of the indentation will automatically guide the fiber end to its center, abutting the flat surface at its end.

In most cases, it is desirable to use any of various materials, such as refractive index matching fluid, epoxy, optical coupling gel, and adhesive between the fiber 21 end and the end surface 33 or depression 34 of the cylindrical hole 19, inside the triangular hole 36 surrounding the fiber 21, in the entrance taper 26, the exit taper 27, or any combination of these. An index matching material, whether fluid, gel, epoxy, adhesive, or other, has a desired function of eliminating or greatly reducing reflection losses at the fiber end and the surface to which it abuts, it being noted that the abutment is generally not a perfect optical contact and, generally, has a small air gap, unless filled with an index matching material. Epoxies and adhesives, wherever used, hold the fiber 21 in place permanently. Most of these materials tend to lubricate the surfaces of the triangular hole 36 to make insertion of the fiber 21 easier, thus allowing a smaller sized triangular hole to be used for greater elastic aligning power.

A more preferred embodiment of the invention is depicted in FIGS. 7, 8 and 9, wherein FIG. 7 is a cross-sectional view of a plastic molded telecentric optical connector somewhat similar to that depicted in a co-pending U.S. patent application by W. John Carlsen, entitled "OPTICAL FIBER CONNECTORS", Ser. No. 112,991, filed Jan. 17, 1980. The plastic molded telecentric optical connector 101 has a circular flange 102 thereabout having a flat 103 thereon for alignment purposes.

The plastic molded telecentric optical connector 101 has a cylindrical hole 19 which terminates at an internal plane surface 33. The internal plane surface 33 has a depression 34 therewithin which centrally aligns with the axis 17.

The telecentric optical connector 101 is formed of transparent plastic and includes a front reference surface 104 which is adapted to mate with a corresponding reference surface of a similar telecentric connector. A convex lens surface 106 is recessed from the reference surface 104. The focal point 107 of the lens 106 lies on the axis 17.

Nominally, an optical fiber has an outside diameter of 0.005 inch which can vary due to manufacturing tolerances. The plastic molded telecentric optical connector 101 contains the depression 34 therewithin; in the preferred embodiment as depicted in FIG. 7 and 9, the depression 34 is a truncated conical recess. In a preferred mode, as depicted in FIG. 9, the depth of the recess is 0.015 inch, the recess 34 terminates at its truncated portion at a cross-section of 0.003 inch, and the wall of the recess 34 forms an angle of 30° with respect to the predetermined axis 17. The walls of the recess 34 are smooth and monotonically decrease from the end surface 33 to the truncated portion of the recess 34, whereby an optical fiber 21 can be smoothly brought into engagement with the connector 101 so that the end of the fiber 21 engages the walls of the recess, stopping when the cross-sectional dimensions of the recess no longer is greater than the diameter of the inserted fiber 21.

The depth of the cylindrical cavity and the recess is such that the specific location 107 along which the end of the fiber to be positioned and centered along the predetermined axis coincides with the focal point 107 of the lens 106 when the optical fiber 21 has a diameter exactly equal to the nominal diameter of the fiber to be centered and positioned.

Though an actual optical fiber 21 may have a diameter which is slightly different from the nominal diameter, the different specific location to which the end of the fiber would be positioned, from the focal point 107, is minuscule and, for pragmatic purposes, can be ignored.

When using a plastic molded telecentric connector 101 having the truncated conical configuration 34 as depicted in FIG. 9 together with the three elastomeric insert means 12, 13, 14 as discussed in connection with FIGS. 1-6 inclusive, an optical fiber can be inserted therewithin so that resulting elastic restoring forces automatically center the fiber along the predetermined axis. The elastomeric insert means has an internal passageway whose surface flares outwardly therewithin to an end thereof that proximates the interior end surface 33 such that offset correction of a fiber 21 produces minimal angular misalignment of the fiber axis from the predetermined axis.

The foregoing invention has various advantages over prior art devices. In large quantities, the centering device 11 inserts are very inexpensive as they can be made by high speed production methods such as injection molding. Because the three sections 12, 13, and 14 are identical, having come from the same mold and the same mold run, the symmetry of the resulting device 11 provides automatic centering of the optical fiber 21 even when the manufacturing mold is slightly imperfect or when the molding conditions yield a slightly different sized part for a given molding run.

A fiber 21 is easily inserted into the central aligning hole 36 because of the large entrance taper 26. Because the tapered sides are soft and resilient, neither the fiber 21 nor the insert 11 is damaged by unsteady hands of an operator. Thus, the insertion of the fiber 21 can be performed without magnifiers or special tools. Furthermore, once the fiber 21 is in place, it remains there because of the holding action of the stretched elastic walls of the triangular hole 36. One does not have to wait for the curing of the epoxy, for example, before releasing the fiber 21, nor is a separate action, such as crimping, required to accomplish the holding effect. Most fluid, epoxies, and the like that have been used in the triangular hole 36 have lubricated the fiber wall interface sufficiently to make insertion and removal easy when actively pushing or pulling on the fiber by hand, but not sufficiently to allow the fiber 21 to slip out on its own when not under external tension. When epoxy or other adhesive is used, therefore, the working device generally can immediately be set aside to cure on its own, while the operator leaves or goes on to the next device.

Furthermore, with the embodiment depicted in FIGS. 3(b) and 4, the indentation at the end of the cylindrical hole 19 provides an alignment accuracy which has not been previously available.

The embodiment depicted in FIGS. 7, 8, and 9 provides an alignment accuracy which has been unexcelled.

Various alternative constructions have been set forth above. It is emphasized, however, that details of the geometrical shape of the device are not critical to its operation as long as central axis symmetry is maintained. For example, the hexagonal outer cross-section can be any other regular polygon, if desired for a given application. It can be circular, though the tolerances for fitting snugly into the cylindrical hole become much tighter. The shape of the taper 26 can be of any generally smooth design. The shape of the central hole 36 is optimal when it contacts the fiber at only three symmetrical places. The triangular shape described is only one such shape. In lieu of a flat portion 31, as shown in FIG. 6, the portion 31 could be curved. Other regular polygons are acceptable for certain materials and dimensions. A circular shaped hole is within the scope of the invention, although a circular shaped hole does not provide a relief space for air or epoxy, etc. as the fiber 21 is inserted.

The principles of the instant invention provide for an automatic self-aligning device for accepting, centering and holding a fiber 21 along a predetermined axis 17 and at a predetermined position along that axis. Furthermore, the concept of utilizing three identical molded elastic sections 12, 13, and 14 to make a device which is highly symmetric, both inside and outside, so that the device 11 is easily insertable into a cylindrical hole 19 where it automatically and precisely centers itself and so that a fiber 21 is easily inserted into its central hole 19, becoming automatically and precisely centered on the axis 17 of the cylindrical hole 19, is believed to be highly advantageous.

Furthermore, the concept of utilizing such a device in conjunction with a backup or final positioning device, that is, the tapered indentation, as depicted in FIGS. 3(b) and 4, for ensuring that the end of the fiber is positioned to a highly specific position, either centered or slightly offset from the axis, is believed to have high desirability.

Other modifications will suggest themselves to those skilled in the art.

What is claimed is:

1. An optical fiber centering device for centering the principal axis of an optical fiber along a predetermined axis of said device, and for positioning an end of said fiber to a specific location along said predetermined axis, comprising
   (a) a receiving member having a cylindrical cavity therewithin, said cylindrical cavity having an axis of revolution coincident with said predetermined axis, said cylindrical cavity terminating at an interior end surface that intersects said predetermined axis at said specific location where said end of said fiber is to be positioned; and
   (b) elastomeric insert means insertable into said cylindrical cavity having
      (i) an external configuration in the shape of a first right regular prism whose cross-section perpendicular to its principal axis of symmetry is a first regular polygon with vertices that extend from said axis of symmetry a distance slightly greater than the radius of said cylindrical cavity, such that, when said means is inserted into said cavity, said vertices are elastically compressed, such that resulting elastic restoring forces act to center said axis of symmetry with respect to said axis of revolution, and, in turn, said predetermined axis; and
      (ii) an internal passageway in the shape of a second right regular prism whose principal axis of symmetry is coincident to said axis of symmetry of said external configuration, a cross-section of said internal passageway perpendicular to its axis of symmetry being a second regular polygon whose closest distance from a point on the perimeter thereof to the center of said second regular polygon is smaller than the radius of the smallest diameter of fiber to be centered and to be positioned along said predetermined axis, whereby
         an optical fiber inserted into said internal passageway compresses said elastomeric insert means, such that resulting elastic restoring forces automatically center said fiber along said axis of symmetry of said first right regular prism, which said last named axis of symmetry coincides with said predetermined axis of said device.

2. The optical fiber centering device as recited in claim 1 wherein said receiving member comprises a transparent material.

3. The device as recited in claim 1 wherein said internal passageway of said elastomeric insert means flares outwardly from a position therewithin to an end thereof where a fiber is to be inserted, to facilitate manual insertion of said fiber.

4. The device as recited in claim 3 wherein said first regular polygon has an infinite number of sides so that said first regular polygon has a circular shape, said external configuration having a radius slightly larger than that of said cylindrical cavity.

5. The device as recited in claim 3 wherein said second regular polygon has an infinite number of sides so that said second regular polygon has a circular shape, said internal passageway having a radius slightly smaller than that of the smallest diameter fiber to be centered and to be positioned along said predetermined axis.

6. The device as recited in claim 3 wherein said first regular polygon is a regular hexagon.

7. The device as recited in claim 3 wherein said second regular polygon is an equilateral triangle.

8. The device as recited in claim 3 wherein said elastomeric insert means comprises three identical parts, each part having first and second matable surfaces which, when assembled, mate respectively with corresponding matable surfaces of the other two parts, along plane surfaces whose planes intersect at a common axis of symmetry of said first and said second regular polygon, thereby assuring an optimum three-fold symmetry of said insert means with respect to said common axis.

9. The device as recited in claim 8 wherein each of said three identical parts is produced by a common mold.

10. The device as recited in claim 8 wherein said first regular polygon is a regular hexagon, said second regular polygon is an equilateral triangle, and wherein the three planes formed where the assembled insert parts mate pass through, respectively, the three vertex lines of the inner triangle, and through respectively three of the six vertex lines of the outer hexagon, whereby said three identical insert parts slip into mutual alignment when inserted into said cylindrical cavity.

11. An optical fiber centering device for centering the principal axis of an optical fiber along a predetermined axis of said device, and for positioning an end of said fiber to a specific location along said predetermined axis comprising
(a) a receiving member having a cylindrical cavity therewithin, said cylindrical cavity having an axis of revolution coincident with said predetermined axis, said cylindrical cavity terminating at an interior end surface, said interior end surface containing a recess for further centering an end of said optical fiber along said predetermined axis to a degree greater than that achievable in the absence of said recess, such that
(i) all cross-sections through said recess and perpendicular to said predetermined axis are shapes in which a unique circle can be inscribed with its center on said predetermined axis,
(ii) the size of the cross-section of said recess, at said interior end surface of said cylindrical cavity, is greater than that of the largest diameter fiber to be centered and positioned,
(iii) the size of said cross-sections decreases smoothly and monotonically away from said cylindrical cavity end surface, until said recess terminates at a cross-section smaller than that of the smallest diameter fiber to be centered and positioned, such that an inserted fiber is guided smoothly along a wall of said recess and is stopped when the cross-sectional dimensions of said recess no longer is greater than the diameter of said inserted fiber, and
(iv) the depth of said cylindrical cavity and said recess are such that said specific location along said predetermined axis where said one end of said fiber is to be positioned is where the cross-sectional dimensions of said recess permits the nominal diameter of said fiber to be centered and positioned, and
(b) elastomeric insert means insertable into said cylindrical body, said insert means having an internal passageway, whereby an optical fiber inserted into said elastomeric insert means causes resulting elastic restoring forces to automatically center said fiber along said predetermined axis, said elastomeric insert means having an internal passageway whose surface flares outwardly therewithin to an end thereof that proximates said interior end surface, such that offset correction of a fiber produces minimal angular misalignment of the fiber axis from said predetermined axis.

12. The device as recited in claim 11 wherein said recess is a truncated conical recess.

13. The device as recited in claim 12 wherein the depth of said recess is 0.015 inch.

14. The device as recited in claim 12 wherein said recess terminates at a cross-section of 0.003 inch.

15. The device as recited in claim 12 wherein said wall of said recess forms an angle of 30 degrees with respect to said predetermined axis.

16. The device as recited in claim 11 wherein said recess is a truncated conical recess, the depth of said recess is 0.015 inch, said recess terminates at a cross-section of 0.003 inch, and said wall of said recess forms an angle of 30 degrees with respect to said predetermined axis.

17. The device as recited in claim 2 wherein said receiving member is an integral part of a telecentric optical connector.

18. The device as recited in claim 17 wherein said telecentric optical connector includes an integrally molded lens surface whose optical axis coincides with said predetermined axis, and whose focal point coincides with said specific location.

* * * * *